United States Patent
Clements et al.

(10) Patent No.: US 7,411,422 B2
(45) Date of Patent: Aug. 12, 2008

(54) DRIVER/EQUALIZER WITH COMPENSATION FOR EQUALIZATION NON-IDEALITIES

(75) Inventors: Steven M. Clements, Raleigh, NC (US); Carrie E. Cox, Cary, NC (US); Hayden C. Cranford, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/103,789

(22) Filed: Apr. 12, 2005

(65) Prior Publication Data

US 2006/0238237 A1    Oct. 26, 2006

(51) Int. Cl.
H03K 17/16    (2006.01)
H03K 19/003    (2006.01)

(52) U.S. Cl. ............................. 326/86; 326/30; 326/26

(58) Field of Classification Search ............. 326/26–27, 326/30, 86, 90, 115, 127; 327/108–112
See application file for complete search history.

(56) References Cited

U.S. PATENT DOCUMENTS

| | | | | |
|---|---|---|---|---|
| 6,104,236 A | 8/2000 | Tsinker | | 327/557 |
| 6,150,875 A | 11/2000 | Tsinker | | 327/552 |
| 6,150,881 A | 11/2000 | Lovelace et al. | | 330/252 |
| 6,266,379 B1 | 7/2001 | Dally | | 375/296 |
| 6,489,838 B1 | 12/2002 | Tsinker | | 327/557 |
| 6,507,225 B2 | 1/2003 | Martin et al. | | 327/108 |
| 6,975,132 B2 * | 12/2005 | Groen et al. | | 326/27 |
| 6,977,534 B2 * | 12/2005 | Radelinow | | 327/112 |
| 2002/0135405 A1 | 9/2002 | Payne et al. | | 327/108 |

OTHER PUBLICATIONS

"Transmitter Equalization for 4-Gbps Signaling", Dally et al, IEEE Micro, Jan./Feb. 1997, pp. 48-56.
"High-speed Equalization", http://www.utdallas.edu/~jinliu/Equalization.pdf, date N/A.
"Using Pre-Emphasis and Equalization with Stratix GX", Altera Corporation, WP-SGXEQUAL-1.0, Sep. 2003, ver. 1.0, pp. 1-11.

* cited by examiner

*Primary Examiner*—Anh Q Tran
(74) *Attorney, Agent, or Firm*—Joscelyn J. Cockburn; James A. Lucas; Driggs, Hogg, Daugherty & Del Zoppo, Co., LPA

(57) ABSTRACT

A high speed serial data communication system includes provisions for the correction of equalization errors, particularly those errors introduced by equalizer non-idealities. The equalization is achieved at the data transmitter, and is based on dynamic current subtraction at the output of a differential pair. When bit time>0, the error current is removed or subtracted from the total driver current, thereby maintaining a constant total current from bit time 0 to bit time>0. The same result can also be achieved by subtracting current when bit time>0 using field effect transistors of the opposite gender. The error current can be determined empirically from simulation or through feedback using a replica of the driver. The circuits for achieving equalization error correction and the resulting electrical network analysis are shown and described.

14 Claims, 3 Drawing Sheets

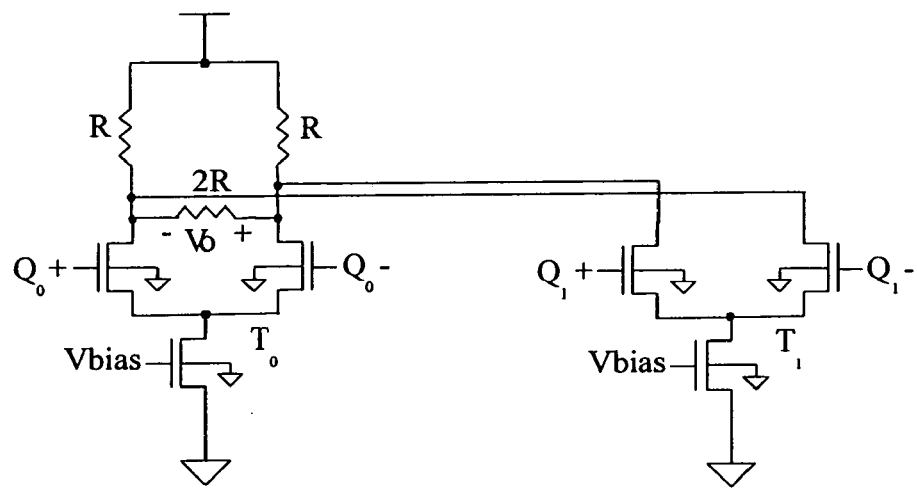
Figure 1: Driver with Equalization Capability
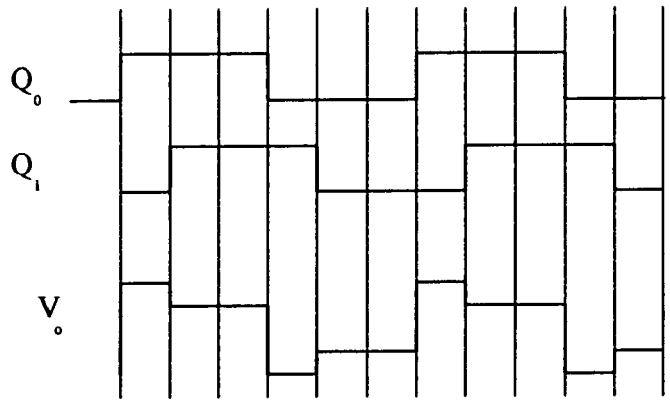
Figure 4: Timing Diagram
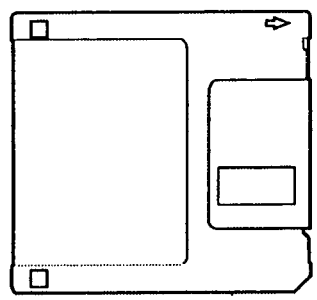
Figure 7

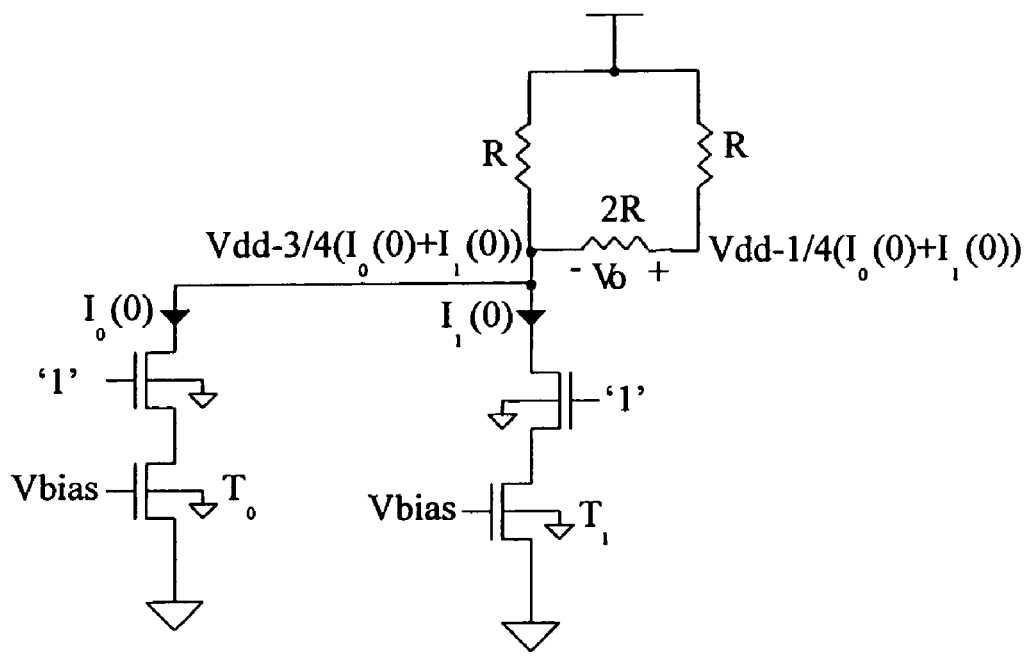
Figure 2: Bit Time 0 where $Q_0+ = Q_1- = $ '1'
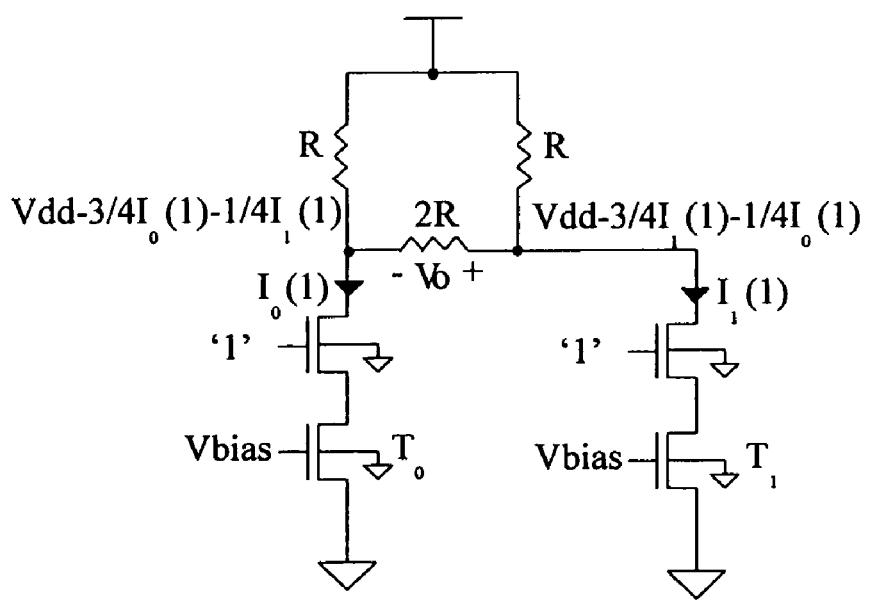
Figure 3: Bit Time 1 where $Q_0+ = Q_1+ = $ '1'

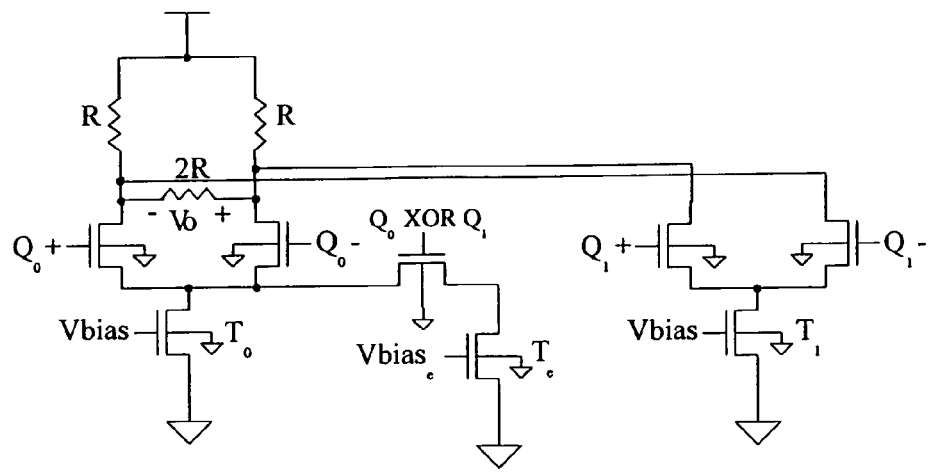
Figure 5: Driver with Equalization Capability and Dynamic Current Correction
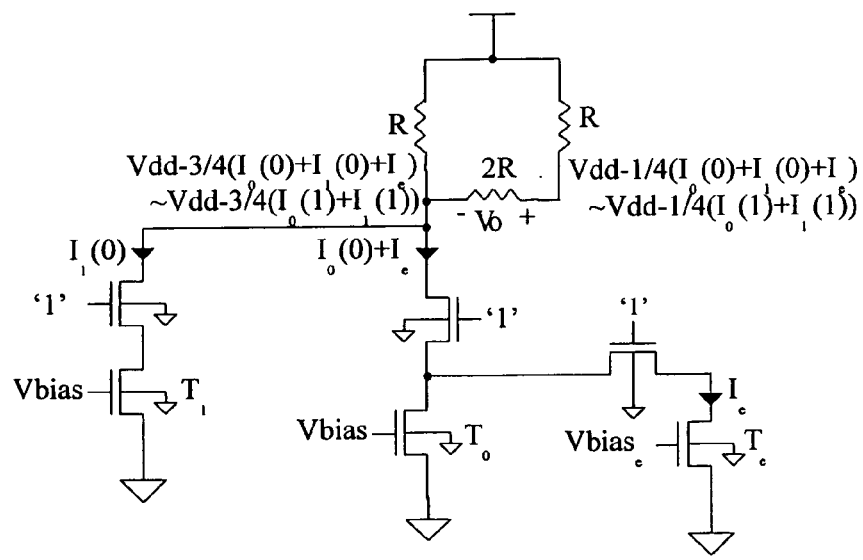
Figure 6: Bit Time 0 where $Q_0+ = Q_1- = $ '1' and with Current Error Correction

DRIVER/EQUALIZER WITH COMPENSATION FOR EQUALIZATION NON-IDEALITIES

FIELD OF THE INVENTION

This invention relates generally to high-speed serial data communication systems that include provisions for the correction of equalization errors, particularly those errors introduced by equalizer non-idealities.

DESCRIPTION OF RELATED ART

System bandwidth often is a bottleneck in the transmission of data. The use of unterminated signaling methods has a practical limit of data rates under 100 MHz. Rates up to about 1 GHz can be achieved using current-mode signaling methods with matched terminations and careful control over line and connector impedance. Using active equalization to overcome frequency-dependent attenuation of copper lines can raise the achievable data rate substantially.

A basic function in communication systems is the transmission of data using different types of media such as twisted pair and coaxial cables, wireless channels, fiber optics cable and satellite links. The media often distorts the transmitted data through ISI (intersymbol interference). This interference is the phenomenon whereby relatively low-frequency data is superimposed onto high-frequency data such that the data transmitted at the different data rates are not well-defined pulses at the system output. Data recovery becomes more difficult and error-prone when ISI is present in the system.

Whatever the cause, it is important to compensate for, or to equalize the distortion. With increasing demands for longer transmission distances and higher transmission speeds in the range of several Gbit/s, the need to compensate or to equalize distortion in the GHz range becomes even more essential.

Generally, in high speed data transmission, equalization is more easily achieved at the transmitter than at the receiver. Equalizing at the transmitter allows for the use of a simple receiver to sample a binary value. Transmitter equalization extends data rates and distances over which electronic digital signaling can reliably be used.

On the other hand, equalization at the receiver requires either an analog to digital converter or a high-speed analog delay line. Both of these approaches present certain circuit design problems that must be met and overcome. Passive equalization (a high-pass filter) is often used in a receiver. The passive filter is designed/tuned to the frequency of interest, though rudimentary programmability is possible. As the equalization is not highly programmable, the designer must assume a certain amount of signal attenuation, making this approach limited in an environment where the media loss varies significantly (the majority of communication systems). Receiver equalization may not be important for the present invention since many communication standards require driver equalization. PCI Express is an example of local internet technology wherein the driver equalization is required to be −3 dB to −4 dB.

One transmission equalization approach that has met with some success is FIR (finite impulse response) equalization. Equalization is an approach where the low-frequency energy components are decreased relative to the high-frequency energy components of the transmitted data. Pre-emphasis is a form of equalization where the high-frequency data amplitude is increased whenever a bit transition occurs. Pre-emphasis is often implemented as an n-tap FIR filter, where earlier, weighted data is subtracted from the present transmitted data.

Even with the use of transmitter pre-emphasis, the amount of equalization does not necessarily represent the ideal ratio due to circuit non-idealities. Pre-emphasis is often achieved in a current-mode, differential driver by subtracting output current for low-frequency data. In this instance, a source of equalization error is the channel-length modulation effects in the current source of a current-mode driver. The drain voltage of the driver current source is directly related to the output voltage, which is constantly changing as the output voltage is equalized. This, in turn, creates an error in the value of the current source due to finite FET output impedance. That is, the current source value during low-frequency data transmission differs from the current source value during high-frequency, pre-emphasized data transmission.

Equalization error is a problem for standards that require limited common-mode noise and/or precise equalization. Standards for data transfer using such architecture as Infiniband® and PCI Express™ specify limited common-mode noise and/or precise equalization requirements. As transmission speeds increase and supply voltages decrease, the solution to this problem becomes more difficult, and assumes greater importance.

There are other approaches for dynamically correcting equalization error with respect to communication channels. At least some of the approaches rely on a network of passive filters, but none of them deal with the correction of equalization errors introduced by equalizer non-idealities.

SUMMARY OF THE INVENTION

To facilitate an understanding of the present invention, the following terms and abbreviations shall have the meanings as follows:

| | |
|---|---|
| CML | current mode logic |
| FET | field effect transistor |
| HSS | high speed signals |
| MAC | media access control |
| MOS | metal oxide semiconductor useful as a transistor |
| SNR | signal to noise ratio |
| VDD | power supply to route the circuit |

The present invention relates to the use of a secondary circuit to dynamically correct the error current produced during equalization. For example, for bit time 0, an error current '$I_e$' is added to the primary current source. When bit time>0, the error current is removed or subtracted from the total driver current, thereby maintaining a constant total current from bit time 0 to bit time>0. The same result can also be achieved by subtracting current when bit time>0 using field effect transistors of the opposite gender. The error current can be determined empirically from simulation or through feedback using a replica of the driver.

The invention also relates to a system, a port circuit and a method for high speed data communication between a transmitter and a receiver. The data is transmitted by a differential output driver, including an equalizer to achieve an equalization value that is dynamically adjusted to correct error current. Equalization is achieved by adjusting the output current of the driver until the desired amount of equalization is achieved. The value of the error current is determined, and a secondary circuit dynamically corrects the error current thereby providing said desired amount of equalization. This equalization value is achieved by removing the low frequency component of an output signal of the output driver. A secondary circuit is used to correct the error current by adding current to the driver current at bit time 0 to compensate for current losses due to channel length modulation when the driver output voltage is low and is subtracted from the driver current at bit time 1 to compensate for current losses. An XOR gate drives a transistor which acts as a switch having either infinite impedance with 0 gate voltage or no impedance at a 1 gate voltage. The output of the driver has a differential output voltage $V_0$ that is equal to $V_0+$ minus $V_0-$. At bit time 0, $V_0-=VDD-\frac{3}{4}(I_0+I_e)R-\frac{3}{4}I_1R=VDD-\frac{3}{4}R(I_0+I_e+I_1)$ and $V_0+=VDD-\frac{1}{4}(I_0+I_e)R-\frac{1}{4}I_1R=VDD-\frac{1}{4}R(I_0+I_e+I_1)$. At bit time 1, $V_0-=VDD-\frac{3}{4}I_0R-\frac{1}{4}I_1R$ and $V_0+=VDD-\frac{1}{4}I_0R-\frac{3}{4}I_1R$, the same as in the prior art.

The invention also relates to an article of manufacture comprising a computer usable medium having a computer readable program embodied therein. The medium is useful with high speed data communications between a transmitter and a receiver utilizing a differential output driver. The program provides compensation for non-idealities in equalization values by removing the low frequency component of an output signal of the driver. The equalization value is adjusted to enable the output current of the driver to approach an ideal output current for a desired amount of equalization.

BRIEF DESCRIPTION OF THE DRAWINGS

The present invention can be more completely understood with reference to the various drawings in which FIG. 1 is a prior art representation of a CML driver with equalization without error correction for equalizer non-idealities;

FIG. 2 shows the prior art circuit operation at bit time 0;

FIG. 3 shows the prior art circuit operation at bit time 1;

FIG. 4 shows a sample timing diagram for signals involved in equalization;

FIG. 5 shows a driver with equalization capability according to the present invention;

FIG. 6 is the present invention circuit at bit time 0;

FIG. 7 is a floppy disc representing software according to the present invention.

DETAILED DESCRIPTION OF THE INVENTION

In the following detailed description, reference is made to the accompanying drawings which show, by way of illustration, specific embodiments in which the invention may be practiced. The same numerals, when used in different figures, describe substantially similar components. The embodiments that are described are sufficient to enable one skilled in the art to practice the invention, not ruling out the use of other embodiments structurally, logically or electrically differing from those portrayed.

The purpose of equalization is to remove energy from the low frequency portion of an output signal rather than maintain constant output amplitude. The CML driver performs equalization whose value is adjusted so that the output current of the driver approaches the ideal output current for a desired amount of equalization. The equalization according to the invention is aided by dynamic error correction of the driver output current. Dynamic error correction of the driver output current is necessary to achieve more accurate equalization in the presence of channel-length modulation of FETs. This can be more clearly pictured by turning to the drawings.

FIG. 1 is a prior art representation of a CML driver with equalization without error correction for equalizer non-idealities. The circuit is an implementation of a two-tap FIR filter where $Q_0$ is the present data and $Q_1$ is the present data delayed by one bit time. $Q_0$ and $Q_1$ drive transistors in a differential pair configuration, where $Q_0$ and $Q_1$ are large signal voltages such that the transistors of the differential pairs act as switches. The gate node of the transistors $T_0$ and $T_1$ are both driven by the bias voltage $V_{bias}$, and the device lengths are normally identical for transistors $T_0$ and $T_1$. The transistor current $I_0$ sourced by $T_0$ and the transistor current $I_1$ sourced by $T_1$ are directly proportional to the devices' widths of $T_0$ and $T_1$ and the shared bias voltage. Ideally, the current of transistor $T_0$ is directly proportional to the current of transistor $T_1$ and is controlled by the node voltage $V_{bias}$ and the widths of devices $T_0$ and $T_1$. Thus, the FIR coefficient weighting is set by the relative sizes of $T_0$ and transistor $T_1$. The differential output voltage, $V_0$, across the resistor is 2 R wherein R typically may have a value of 50 ohms for a high speed data transmission system. The value of $V_0$ can be expressed as $V_0=V_0+-V_0-$, or the positive node voltage of $V_0$ less the negative node voltage of $V_0$.

FIG. 2 shows the prior art circuit operation at bit time 0 for $Q_0$='1'. The differential pairs driven by $Q_0$ and $Q_1$ are reduced to wires with no voltage drop in this analysis as the devices are treated as switches. During bit time 0, the $Q_0$ initially transitions from a low to a high voltage level, while $Q_1$ is at a low voltage level. The drain nodes of transistors $T_0$ and $T_1$ are both connected to the negative node voltage of $V_0$, $V_0-$. Electrical network analysis yields $V_0-=VDD-\frac{3}{4}I_0R-\frac{3}{4}I_1R=VDD-\frac{3}{4}R(I_0+I_1)$ and $V_0+=VDD-\frac{1}{4}I_0R-\frac{1}{4}I_1R=VDD-\frac{1}{4}R(I_0+I_1)$. The differential output voltage $V_0=V_0+-V_0-=\frac{1}{2}R(I_0+I_1)$. The common-mode voltage is the average of the positive and negative node voltages of the output, which is $VDD-\frac{1}{2}R(I_0+I_1)$.

FIG. 3 shows the prior art circuit operation at bit time 1. During bit time 1, $Q_0$ remains at a high voltage level, while $Q_1$ transitions from a low voltage level to a high voltage level. As $Q_1$ transitions from a low to a high voltage level, transistor $T_1$ sources current from the positive node voltage of $V_0$. Transistor $T_0$ continues to source current from the negative node voltage of $V_0$. Electrical network analysis yields $V_0-=VDD-\frac{3}{4}I_0R-\frac{1}{4}I_1R$ and $V_0+=VDD-\frac{1}{4}I_0R-\frac{3}{4}I_1R$. The differential output voltage $V_0=V_0+-V_0-=\frac{1}{2}RI_0-\frac{1}{2}RI_1$. For bit times greater than 0, the differential output voltage is reduced by $\frac{1}{2}I_1R$. The common-mode voltage is the average of the positive and negative node voltages of the output, which is $VDD-\frac{1}{2}R(I_0+I_1)$.

FIG. 4 shows a timing diagram for $Q_0$, $Q_1$, and the differential output voltage. The diagram shows that for low-frequency data, the differential output voltage is reduced. Thus, pre-emphasis is accomplished.

A source of equalization error is the channel-length modulation effect in the current source of a CML driver. Channel-length modulation is the phenomena in FETs wherein the drain voltage of an FET affects the output current of an FET in the saturated region of operation. Channel-length modulation can be viewed as finite FET output impedance as the FET is no longer an ideal current source whose value is controlled by the FET gate voltage. For the circuit of FIG. 1, the drain voltage of transistors $T_0$ and $T_1$ are connected to the output node voltages, which is changing as the output voltage is equalized. The output voltage change alters the transistor current due to channel-length modulation. That is, $I_0$ and $I_1$ during low-frequency data transmission differs from the $I_0$ and $I_1$ value during high-frequency, pre-emphasized data transmission. As such, the expected differential output voltage is compromised for equalized data.

Referring to the prior art, as the output node voltages are altered for bit time 0 versus bit time 1, the drain node of $Q_0$ and $Q_1$ change during equalization. Consequently, $Q_0$ and $Q_1$ experience channel-length modulation where $I_0$ and $I_1$ change from bit time 0 to bit time>0. Due to this fact, the differential output voltage and common-mode voltage can be substantially different than the ideal circuit analysis suggests. The change in the output current during bit time>0 can be defined as the error current, $I_e$. The present invention dynamically changes the driver output current to correct the error current introduced by channel-length modulation effects during equalization.

Turning now to the drawings that are representative of the present invention, FIG. 5 represents a CML driver with equalization error correction. The device whose gate is driven by the exclusive-or of $Q_0$ and $Q_1$ is treated as a switch. The device $T_e$ adds a current $I_e$ to the current $I_0$ when $Q_0$ and $Q_1$ are not equal. As $Q_1$ is defined as $Q_0$ delayed by one bit time, $Q_0$ and $Q_1$ are not equal during bit time 0 only. Consequently, the current $I_e$ is added to current $I_0$ during bit time 0. The intent is to add current to the output voltage node for bit time 0 to compensate for the current lost in $I_0$ due to channel-length modulation at bit time 0 when the output voltage is low.

FIG. 6 is the present invention circuit at bit time 0. The drain nodes of transistors $T_0$, $T_e$, and $T_1$ are connected to the negative node voltage of $V_0$, $V_0-$. The previous analysis applied to FIG. 2 can be repeated where $I_0$ is replaced by $I_0+I_e$. Thus, $V_0-=VDD-\frac{3}{4}(I_0+I_e)R-\frac{3}{4}I_1R=VDD-\frac{3}{4}R(I_0+I_e+I_1)$ and $V_0+=VDD-\frac{1}{4}(I_0+I_e)R-\frac{1}{4}I_1R=VDD-\frac{1}{4}R(I_0+I_e+I_1)$. The differential output voltage $V_0=V_0+-V_0-=\frac{1}{2}R(I_0+I_e+I_1)$. Thus, the differential output voltage is increased by $\frac{1}{2}RI_e$ during bit time 0 for the present invention. The common-mode voltage is the average of the positive and negative node voltages of the output, which is $VDD-\frac{1}{2}R(I_0+I_e+I_1)$.

For bit time 1, the present invention simplifies to the prior art circuit of FIG. 3. The current $I_e$ is no longer sourced into the output node. Thus, the $I_0$ current is effectively lessened by the current $I_e$. The analysis applied to FIG. 3 yields the same result for the present invention. Thus, the differential output voltage $V_0=V_0+-V_0-=\frac{1}{2}RI_0-\frac{1}{2}RI_1$. For bit times greater than 0, the differential output voltage is reduced by $\frac{1}{2}(I_1+I_e)R$ versus bit time 0. The common-mode voltage is the average of the positive and negative node voltages of the output, which is $VDD-\frac{1}{2}R(I_0+I_1)$.

Thus, the present invention gives a method for altering the driver output dynamically such that the ideal equalization amount is achieved. Alternative methods to correcting the output current during equalization are possible. One alternative implementation could be achieved by subtracting current when bit time>0 using field effect transistors of the opposite gender.

FIG. 7 shows a computer-readable medium in the form of a floppy disc 110 for containing the software implementation of the program to carry out the various steps of project management according to the present invention. Other machine readable storage mediums are fixed hard drives, optical discs, magnetic tapes, semiconductor memories, such as read-only memories (ROMs), programmable (PROMs), etc. The article containing this computer readable code is utilized by executing the code directly from the storage device, or by copying the code from one storage device to another storage device, or by transmitting the code on a network for remote execution.

Integrated circuits can be of any type capable of including simultaneously bidirectional port circuits. Thus, microprocessors, digital signal processors, and microcontrollers are contemplated as being used. Other integrated circuits that may not be processors, such as application-specific integrated circuits (ASIC), a communication device, a memory controller or a memory such as a dynamic random access memory (DRAM), are likewise contemplated The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context mean any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A system for high speed data communication between a transmitter and a receiver comprising a differential output driver including an equalizer to achieve an equalization value wherein the equalization value is dynamically adjusted to correct error current $I_e$ introduced by channel length modulation effects during equalization, wherein a secondary circuit corrects the error current by adding current to the driver current at bit time 0 to compensate for current losses due to channel length modulation when the driver output voltage is low and is subtracted from the driver current at bit time 1 to compensate for current losses.

whereby the output current of the driver approaches an ideal output current for a desired amount of equalization.

2. The system according to claim 1 wherein the value of the error current is determined, and a secondary circuit dynamically corrects the error current thereby providing said desired amount of equalization.

3. The system according to claim 1 wherein the equalization value is achieved by removing the low frequency component of an output signal of the driver.

4. The system according to claim 1 including an XOR gate driving a '1' or a '0' voltage.

5. The system according to claim 4 wherein the XOR gate drives a transistor to act as a switch wherein a 0 gate voltage causes the switch to be open, and wherein a 1 gate voltage causes the switch to be closed.

6. The system according to claim 1 wherein the output of the driver has a differential output voltage $V_0$ that is equal to $V_0+$ minus $V_0-$.

7. The system according to claim 6 wherein at bit time 0, $V_0-=VDD-\frac{3}{4}(I_0+I_e)R-\frac{3}{4}I_1R=VDD-\frac{3}{4}R(I_0+I_e+I_1)$ and $V_0+=VDD-\frac{1}{4}(I_0+I_e)R-\frac{1}{4}I_1R=VDD-\frac{1}{4}R(I_0+I_e+I_1)$ and at bit time 1, $V_o-=VDD-\frac{3}{4}I_0R-\frac{1}{4}I_1R$ and $V_o+=VDD-\frac{1}{4}I_0R-\frac{3}{4}I_1R$.

8. A port circuit for a differential output driver of a high speed transmitter, said driver comprising a differential pair, the circuit including an equalizer to achieve an equalization value that is dynamically adjustable to correct error current $I_e$ utilizing a secondary circuit to dynamically correct the error current by adding current to the driver current at bit time 0 to compensate for current losses due to channel length modulation when the driver output voltage is low, and by subtracting current from the driver current at bit time 1, whereby the output current of the driver can approach an ideal output current for a desired amount of equalization.

9. The circuit according to claim 8 including a transistor $T_0$ driven by an XOR gate at gate voltage 0 and a transistor $T_1$ driven by said XOR gate at gate voltage 1.

10. The circuit according to claim 9 wherein the output of the driver has a differential output voltage $V_0$ that is equal to $V_0+$ minus $V_0-$.

11. The circuit according to claim 10 wherein $I_0$ is the current sourced by $T_0$, $I_1$ is the current sourced by $T_1$, and $I_e$ is the error current sourced by $T_e$, at bit time 0, $V_o-=VDD-\frac{3}{4}(I_0+I_e)R-\frac{3}{4}I_1R=VDD-\frac{3}{4}R(I_0+I_e+I_1)$ and $V_o+=VDD-\frac{1}{4}(I_0+I_e)R-\frac{1}{4}I_1R=VDD-\frac{1}{4}R(I_0+I_e+I_1)$ and at bit time 1, $V_o-=VDD-\frac{3}{4}I_0R-\frac{1}{4}I_1R$ and $V_o+=VDD-\frac{1}{4}I_0R-\frac{3}{4}I_1R$.

12. A method for correcting the equalization errors that occur in high speed data communication by differentially driving a load, comprising the steps of:

a. driving a first output of a differential pair with a positive current value;

b. driving a second output of a differential pair with a negative current value;

c. subtracting the current of the first output from the current of the second output, d. determining an error current value, and e. providing a secondary current $I_e$ to dynamically correct the error current by adding current to the driver current at bit time 0 to compensate for current losses due to channel length modulation when the driver output voltage is low, and subtracting current from the driver current at bit time 1, whereby the obtained value approaches the ideal output current for a desired amount of equalization.

13. The method according to claim 12 including the step of providing a transistor $T_e$ that is driven by the error current $I_e$, the transistor $T_e$ being switched on by an XOR gate voltage=1 to source the error current $I_e$, and being switched off to not source the error current $I_e$ when the XOR gate voltage is 0.

14. The method according to claim 13 wherein $I_0$ is the current sourced by $T_0$, $I_1$ is the current sourced by $T_1$, and $I_e$ is the error current sourced by $T_e$, and analyzing the electrical network to yield the equations at bit time 0, $V_0-=VDD-\frac{3}{4}(I_0+I_e)R-\frac{3}{4}I_1R=VDD-\frac{3}{4}R(I_0+I_e+I_1)$ and $V_o+=VDD-\frac{1}{4}(I_0+I_e)R-\frac{1}{4}I_1R=VDD-\frac{1}{4}R(I_0+I_e+I_1)$ and at bit time 1, $V_o-=VDD-\frac{3}{4}I_0R-\frac{1}{4}I_1R$ and $V_o+=VDD-\frac{1}{4}I_0R-\frac{3}{4}I_1R$.

* * * * *